United States Patent
Huff et al.

(10) Patent No.: US 8,034,429 B2
(45) Date of Patent: *Oct. 11, 2011

(54) SPECIAL TURF FILLER

(75) Inventors: Carl L. Huff, Reagan, TX (US); Randolph S. Reddick, Calhoun, GA (US)

(73) Assignee: USGreentech, L.L.C., Newtown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,223

(22) Filed: Sep. 25, 2009

(65) Prior Publication Data

US 2010/0015448 A1   Jan. 21, 2010

Related U.S. Application Data

(63) Continuation of application No. 11/713,891, filed on Mar. 5, 2007, now Pat. No. 7,858,148.

(51) Int. Cl.
*B32B 5/16* (2006.01)
*B32B 33/00* (2006.01)
*B05D 7/00* (2006.01)

(52) U.S. Cl. ............ 428/87; 428/17; 428/403; 428/406; 428/407; 427/221; 427/220; 427/218

(58) Field of Classification Search .................. 428/402, 428/403, 17, 86, 87, 404, 406, 407; 427/17, 427/220, 221, 218, 212, 215

See application file for complete search history.

(56) References Cited

U.S. PATENT DOCUMENTS

| | | | |
|---|---|---|---|
| 2,106,317 A | 1/1938 | Dezendorf |
| 2,695,851 A | 11/1954 | Lodge |
| 2,700,003 A | 1/1955 | Gundlach |
| 2,934,455 A | 2/1956 | Dober |
| 3,003,643 A | 10/1961 | Thomas |
| 3,079,209 A | 2/1963 | Boggus |
| 3,092,836 A | 6/1963 | Boggus |
| 3,099,574 A | 7/1963 | Bernier |
| 3,441,362 A | 4/1969 | Streck |
| 3,443,492 A | 5/1969 | Pleass |
| 3,503,771 A | 3/1970 | Kroyer |
| 3,513,061 A | 5/1970 | Vinicki |
| 3,513,062 A | 5/1970 | Vinicki |

(Continued)

FOREIGN PATENT DOCUMENTS

DE   195 40 623 A1   5/1997

(Continued)

OTHER PUBLICATIONS

English translation of JP5171611 in the name of Sekisui Chemical Co., Ltd., published Jul. 9, 1993.

(Continued)

*Primary Examiner* — Cheryl Juska

(74) *Attorney, Agent, or Firm* — Wood, Herron & Evans, LLP

(57) ABSTRACT

An aggregate turf filler for use with the turf of athletic fields and landscaped areas which comprise crushed silica sand particles ($SiO_2$) which are substantially round in shape and are sized to be between 12 and 40 mesh. An acrylic based sealer covering the outer surface of each of the silica sand particles. Finally, providing that the silica sand particles have a smooth outer surface, possess an angle of repose of less than 30°, repel water, resist compacting, present no damaging sharp edges when incorporated with the turf and are environmentally safe.

18 Claims, 3 Drawing Sheets

U.S. PATENT DOCUMENTS

| | | | | |
|---|---|---|---|---|
| 3,557,038 | A | 1/1971 | Gebura | |
| 3,795,180 | A | 3/1974 | Larsen | |
| 3,917,771 | A | 11/1975 | Basile | |
| 4,188,154 | A | 2/1980 | Izatt | |
| 4,268,551 | A | 5/1981 | Moore, Jr. | |
| 4,356,220 | A | 10/1982 | Benedyk | |
| 4,412,015 | A | 10/1983 | Lustgarten et al. | |
| 4,462,184 | A | 7/1984 | Cunningham | |
| 4,497,853 | A | 2/1985 | Tomarin | |
| 4,606,963 | A | 8/1986 | Farrell | |
| 4,749,479 | A | 6/1988 | Gray | |
| 4,750,909 | A | 6/1988 | Streck | |
| 4,913,596 | A | 4/1990 | Lambert, III | |
| 4,934,865 | A | 6/1990 | Varkonyi et al. | |
| 5,017,040 | A | 5/1991 | Mott | |
| 5,041,320 | A * | 8/1991 | Meredith et al. | 428/87 |
| 5,064,308 | A | 11/1991 | Almond et al. | |
| 5,076,726 | A | 12/1991 | Heath | |
| 5,151,123 | A | 9/1992 | Kviesitis | |
| 5,250,340 | A | 10/1993 | Bohnhoff | |
| 5,254,364 | A | 10/1993 | Kviesitis | |
| 5,262,453 | A * | 11/1993 | Watanabe et al. | 523/209 |
| 5,264,029 | A | 11/1993 | Kviesitis | |
| 5,306,317 | A | 4/1994 | Yoshizaki | |
| 5,383,314 | A | 1/1995 | Rothberg | |
| 5,411,352 | A | 5/1995 | Eren | |
| 5,458,973 | A | 10/1995 | Jeffs | |
| 5,460,867 | A | 10/1995 | Magnuson et al. | |
| 5,538,787 | A | 7/1996 | Nachtman et al. | |
| 5,583,165 | A | 12/1996 | Kviesitis | |
| 5,688,073 | A | 11/1997 | Brodeur et al. | |
| 5,752,784 | A | 5/1998 | Motz et al. | |
| 5,780,144 | A | 7/1998 | Bradley | |
| 5,820,296 | A | 10/1998 | Goughnour | |
| 5,823,711 | A | 10/1998 | Herd et al. | |
| 5,848,856 | A | 12/1998 | Bohnhoff | |
| 5,849,124 | A | 12/1998 | Rusk, Jr. | |
| 5,908,673 | A | 6/1999 | Muhlberger | |
| 5,950,936 | A | 9/1999 | Bergart | |
| 5,958,527 | A | 9/1999 | Prevost | |
| 5,961,389 | A * | 10/1999 | Dickinson | 472/92 |
| 6,029,477 | A | 2/2000 | Hanvey, Jr. | |
| 6,168,102 | B1 | 1/2001 | Bergart | |
| 6,221,445 | B1 | 4/2001 | Jones | |
| 6,235,372 | B1 | 5/2001 | Joedicke | |
| 6,238,794 | B1 | 5/2001 | Beesley | |
| 6,263,633 | B1 | 7/2001 | Hagenah | |
| 6,299,959 | B1 | 10/2001 | Squires et al. | |
| 6,338,871 | B1 | 1/2002 | Shin | |
| 6,432,505 | B1 | 8/2002 | Sweenie et al. | |
| 6,443,996 | B1 | 9/2002 | Mihelich | |
| 6,500,543 | B2 | 12/2002 | Sakai | |
| 6,582,819 | B2 | 6/2003 | McDaniel et al. | |
| 6,610,405 | B2 | 8/2003 | Iriguchi et al. | |
| 6,630,530 | B1 | 10/2003 | Han | |
| 6,632,527 | B1 | 10/2003 | McDaniel et al. | |
| 6,645,627 | B1 | 11/2003 | Rossi et al. | |
| 6,689,447 | B2 | 2/2004 | Prevost | |
| 6,746,752 | B2 | 6/2004 | Prevost | |
| 6,800,339 | B2 | 10/2004 | Motz et al. | |
| 6,805,936 | B2 * | 10/2004 | Seaton | 428/87 |
| 6,818,274 | B1 | 11/2004 | Buck et al. | |
| 6,818,300 | B2 | 11/2004 | Loyd et al. | |
| 6,884,509 | B2 | 4/2005 | Huff et al. | |
| 6,946,181 | B2 | 9/2005 | Prevost | |
| 7,144,609 | B2 | 12/2006 | Reddick | |
| 7,300,689 | B2 | 11/2007 | Prevost | |
| 2002/0006481 | A1 | 1/2002 | Morris | |
| 2003/0182855 | A1 | 10/2003 | Prevost | |
| 2004/0086664 | A1 * | 5/2004 | Seaton | 428/17 |
| 2004/0229007 | A1 | 11/2004 | Motz et al. | |
| 2005/0031803 | A1 | 2/2005 | Prevost | |
| 2005/0042032 | A1 | 2/2005 | Motz et al. | |
| 2006/0100342 | A1 * | 5/2006 | Jensen | 524/492 |
| 2006/0134374 | A1 | 6/2006 | Bell et al. | |
| 2006/0147670 | A1 | 7/2006 | Reddick | |
| 2007/0160800 | A1 | 7/2007 | Reddick | |
| 2007/0254131 | A1 | 11/2007 | Shail et al. | |
| 2008/0050516 | A1 * | 2/2008 | Dickinson | 427/180 |
| 2008/0141516 | A1 * | 6/2008 | Julicher et al. | 29/419.1 |
| 2008/0145574 | A1 * | 6/2008 | Julicher et al. | 428/17 |
| 2008/0176009 | A1 * | 7/2008 | Chereau et al. | 428/17 |
| 2008/0182040 | A1 * | 7/2008 | Chereau et al. | 428/17 |
| 2009/0011845 | A1 | 1/2009 | Weber | |
| 2009/0011873 | A1 | 1/2009 | Weber | |

FOREIGN PATENT DOCUMENTS

| | | | |
|---|---|---|---|
| EP | 377925 A * | 7/1990 | |
| JP | 05 171611 A | 7/1993 | |
| JP | 2003171908 A | 6/2003 | |
| KR | 754961 B1 * | 9/2007 | |
| WO | 03 042293 A1 | 5/2003 | |
| WO | WO 2004022853 A1 * | 3/2004 | |
| WO | 2004 056881 | 7/2004 | |

OTHER PUBLICATIONS

Reddick Declaration, plus accompanying Exhibits A-AA, Oct. 23, 2009.

Three sheets alleged to support the "on sale" allegation, dated Sep. 1, 2001, Aug. 21, 2000, and Sep. 5, 2000.

U.S. Patent and Trademark Office, Office Action in related U.S. Appl. No. 11/373,885, dated Mar. 31, 2008, 13pp.

U.S. Patent and Trademark Office, Office Action in related U.S. Appl. No. 11/373,885, dated Sep. 18, 2008, 12 pp.

U.S. Patent and Trademark Office, Office Action in related U.S. Appl. No. 11/373,885, dated Mar. 3, 2009, 15 pp.

U.S. Patent and Trademark Office, Office Action in related U.S. Appl. No. 10/811,737, dated Feb. 3, 2006, 14 pp.

U.S. Patent and Trademark Office, Office Action in related U.S. Appl. No. 10/811,737, dated May 9, 2006, 8 pp.

U.S. Patent and Trademark Office, Office Action in related U.S. Appl. No. 10/811,737, dated Jul. 25, 2006, 11 pp.

U.S. Patent and Trademark Office, Office Action in related U.S. Appl. No. 10/422,129, dated Oct. 4, 2004, 8 pp.

U.S. Patent and Trademark Office, Office Action in related U.S. Appl. No. 10/422,129, dated Jan. 12, 2005, 8 pp.

U.S. Patent and Trademark Office, Office Action in related U.S. Appl. No. 11/713,891, dated Oct. 8, 2008, 10 pp.

U.S. Patent and Trademark Office, Office Action in related U.S. Appl. No. 11/713,891, dated May 13, 2009, 16 pp.

U.S. Patent and Trademark Office, Office Action in related U.S. Appl. No. 11/713,891, dated Jun. 17, 2009, 5 pp.

Vance Bros. Inc., "Advantage Sport Coating Products" brochure, 3 pp, Sep. 19, 2004.

LATEX-ITE, "Aggregate Filled Acrylic Color System Product Specifications", brochure, 1997, 3 pp.

"Material Safety Data Sheet" brochure, Jan. 15, 2003, 2 pp.

* cited by examiner

SPECIAL TURF FILLER

CROSS REFERENCE TO RELATED APPLICATIONS

This application is a continuation application of U.S. patent application Ser. No. 11/713,891, filed Mar. 5, 2007, which is a continuation-in-part application of U.S. patent application Ser. No. 11/373,885, filed Mar. 13, 2006, which is a continuation-in-part application of U.S. application Ser. No. 10/811,737, filed Mar. 29, 2004, now U.S. Pat. No. 7,144,609, which is a continuation-in-part application of U.S. patent application Ser. No. 10/422,129, filed Apr. 24, 2003, now U.S. Pat. No. 6,884,509, the entire contents of which are hereby incorporated by reference herein.

BACKGROUND OF THE INVENTION

The instant invention is directed to a filler for use with artificial surfaces such as athletic playing fields, landscaped public and private areas.

Artificial surfaces for the above stated uses are becoming more and more common for various reasons to include aesthetic appearance, maintenance, evenness of the surface, etc. Fillers for use with such surfaces are also common. Normally such fillers would include sand, crumb rubber and crushed stone. It is also known to color these fillers to enhance the appearance of the surface.

The usual natural and colored fillers have several drawbacks to include mounding and damage to the artificial fiber due to an abrasive cuffing action brought about by the sharp edges of sand particles.

It is an object of this invention to provide a filler for artificial turf which will not mound.

Another object of the invention is the provision of filler for artificial turf consisting of rounded granules.

Another object of the invention is the provision of a filler for artificial turf in which each granule is of a restricted size profile.

Another object of the invention is the provision of a filler for an artificial turf surface in which the filler is coated with an acrylic based sealer.

A further object of the invention is the provision of a silica sand filler coated with a colored acrylic based sealer for use with an artificial turf.

Finally, an object of the invention is an artificial turf to include a pile fabric secured in position on the ground and a filler evenly distributed on the surface of said pile fabric with a repose of less than 30° and a resistance to washing away.

The invention is directed to an aggregate turf filler for use with the turf of athletic fields and landscaped areas. The turf may be natural or artificial. The turf filler is composed of:
  silica sand particles ($SiO_2$) which are substantially round in shape and are sized to be between 12 and 40 mesh. The particles are coated with an acrylic sealer which seals the outer surface of each of the silica sand particles. So treated the silica sand particles possess an angle of repose of less than 30°, repel water, resist compacting, present no damaging sharp edges when incorporated with the turf and are environmentally safe. The silica sand particles are sized to be within no more than five mesh sizes.

The acrylic coating includes natural color pigment of a selected color which is preferably iron oxide ($FeO_2$) for black and chrome III oxide ($Cr_2O_3$) for green. Other colors may be obtained by blending basic colors. The color pigment and the acrylic based sealer are preferably combined at a ratio of 1 part color pigment to 2 parts acrylic sealer.

The aggregate is evenly applied over the turf to a level of between 0.25 to 2.00 inches.

The invention is also directed to a method of producing an aggregate filler for use with athletic fields and landscaped area which includes the steps of:
  (A) forming silica sand particles ($SiO_2$) to be substantially round;
  (B) sizing the silica sand particles to be in a range between 12 and 40 mesh;
  (C) combining a clear acrylic based sealer and a natural colorant forming a colored acrylic sealer; and
  (D) mixing the silica sand with the colored acrylic based sealant forming an environmentally safe coated aggregate filler having an angle of repose of less than 30°.

The method further includes providing that the colorant is iron oxide ($FeO_2$) or chrome III oxide ($Cr_2O_3$) and is normally mixed with the acrylic based sealer at a 1 to 2 ratio.

The method also includes spreading the aggregate filler over artificial playing surfaces or landscaped surfaces at a depth which is normally between 0.25 to 2.00 inches.

The method of producing a decorative and environmentally safe aggregate filler also includes:
  (A) crushing silica sand into particles;
  (B) screening the particles and selecting screened particles to be within five mesh sizes;
  (C) blending an acrylic based sealant and a colorant at a ratio of between 0.5-1.5 part colorant and 1.5-2.5 acrylic sealant; and,
  (D) mixing the blended acrylic based sealer and colorant with the aggregate filler forming a colored aggregate filler.

The method of producing a decorative and environmentally safe aggregate filler including providing an acrylic based sealer consisting of acrylic polymer, mineral spirits, ethylbenzene and xylene and coating silica sand particles sized between 12 and 40 mesh with the sealer.

The use of fillers with both natural and artificial turf areas is well known. Also, the use of colored fillers with both natural and artificial turf areas is well known. The fillers act to provide a more even surface area having acceptable resistance to impact and recovery from impact. Fillers further provide for improved drainage and controlled hardness.

Figure 1:
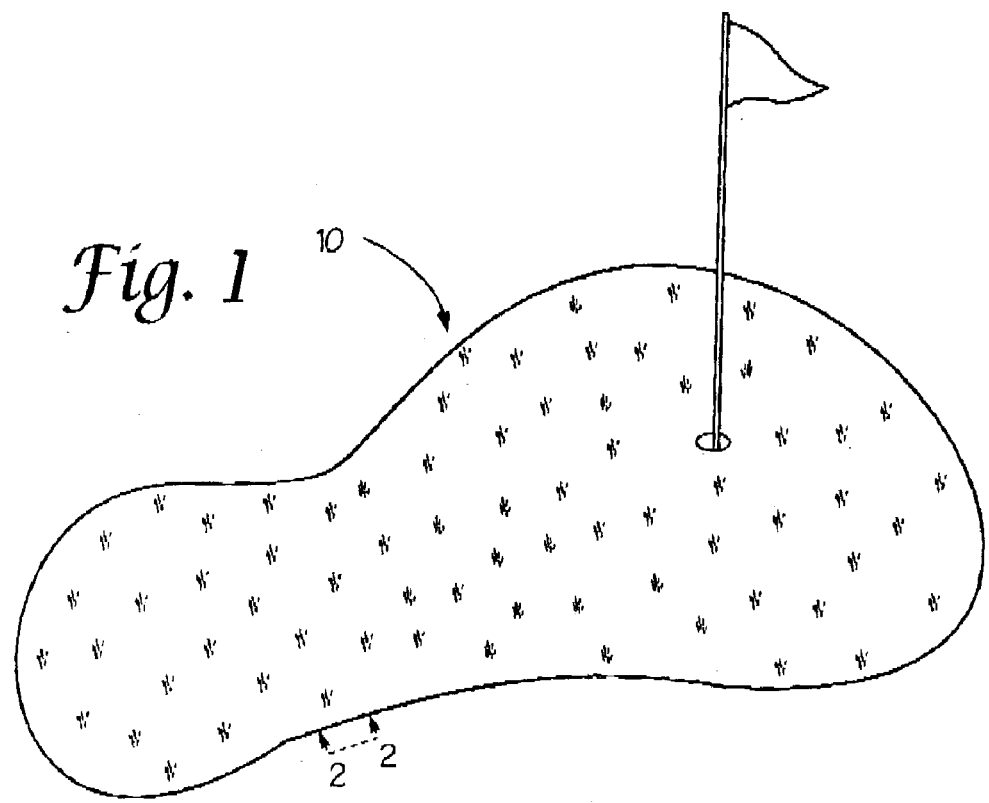
FIG. 1 is a perspective view of a golf green, one of the athletic fields with which the filler of the invention finds use.

Turning now to the drawings, FIG. 1 shows a putting green 10 with which the aggregate filler of the invention may be applied. The aggregate may be of natural color or it may be colored as desired. The putting green may have a natural putting surface or an artificial putting surface. Other surfaces such as soccer fields, football fields, volleyball fields, baseball fields, etc. either natural and artificial, find beneficial results both aesthetically and structurally by using the filler of the invention. Landscaped areas, both natural and artificial, also benefit from the use of the filler of the invention.

Turning now to FIGS. 2-5, there is seen a surface area 12 in which artificial grass-like tufts 14 extend from backing surface 16 in the usual manner. Filler 18, comprising aggregate granules 20, is evenly spread over area 12 to a height of 0.25 to 2.00 inches. It will be noted that granules 20 are substantially round and also are substantially of equal size as better illustrated in FIGS. 3-5. This feature results in the filler resisting compacting because there are no small particles to settle to the bottom. The round and equally sized particles also resist mounding because, so structured, they present an angle of repose of <30°. Note FIG. 3.

Figure 2:
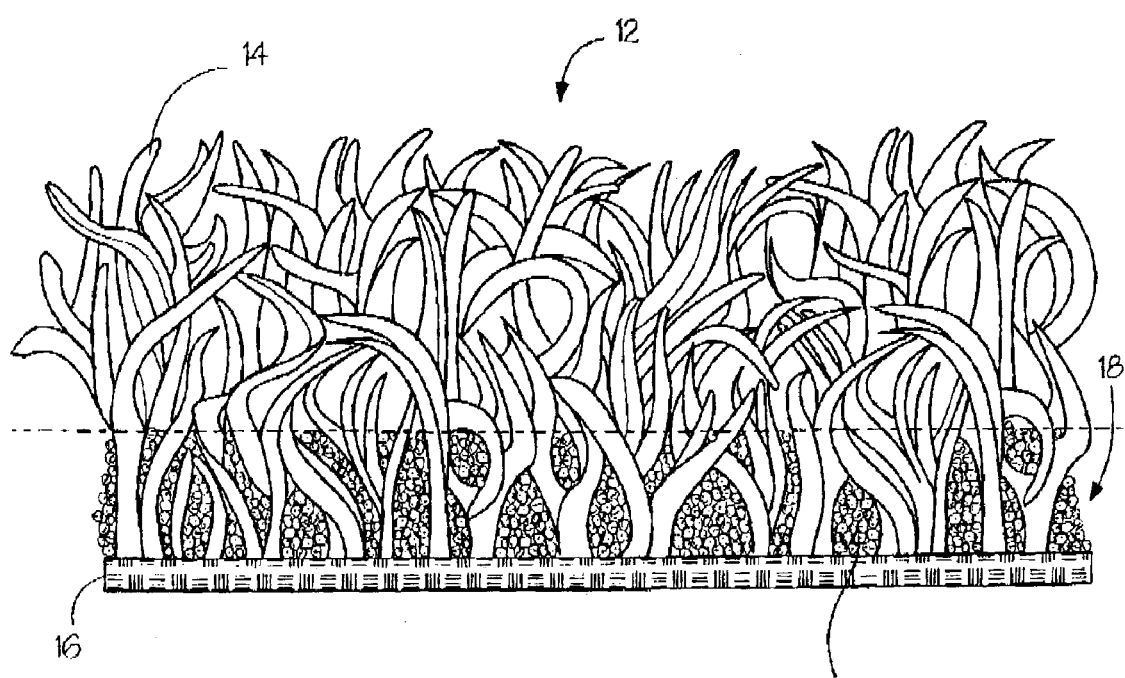
FIG. 2 is a side cutaway view taken along line 2-2 of FIG. 1 of an area incorporating the filler of the invention.
Figure 3:
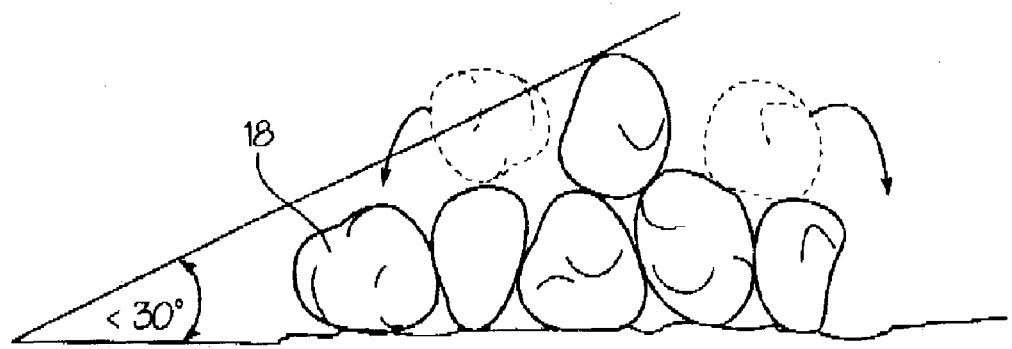
FIG. 3 is a diagrammatic side view showing the filler stacked to its maximum angle of repose, i.e. <30°.
Figure 5:
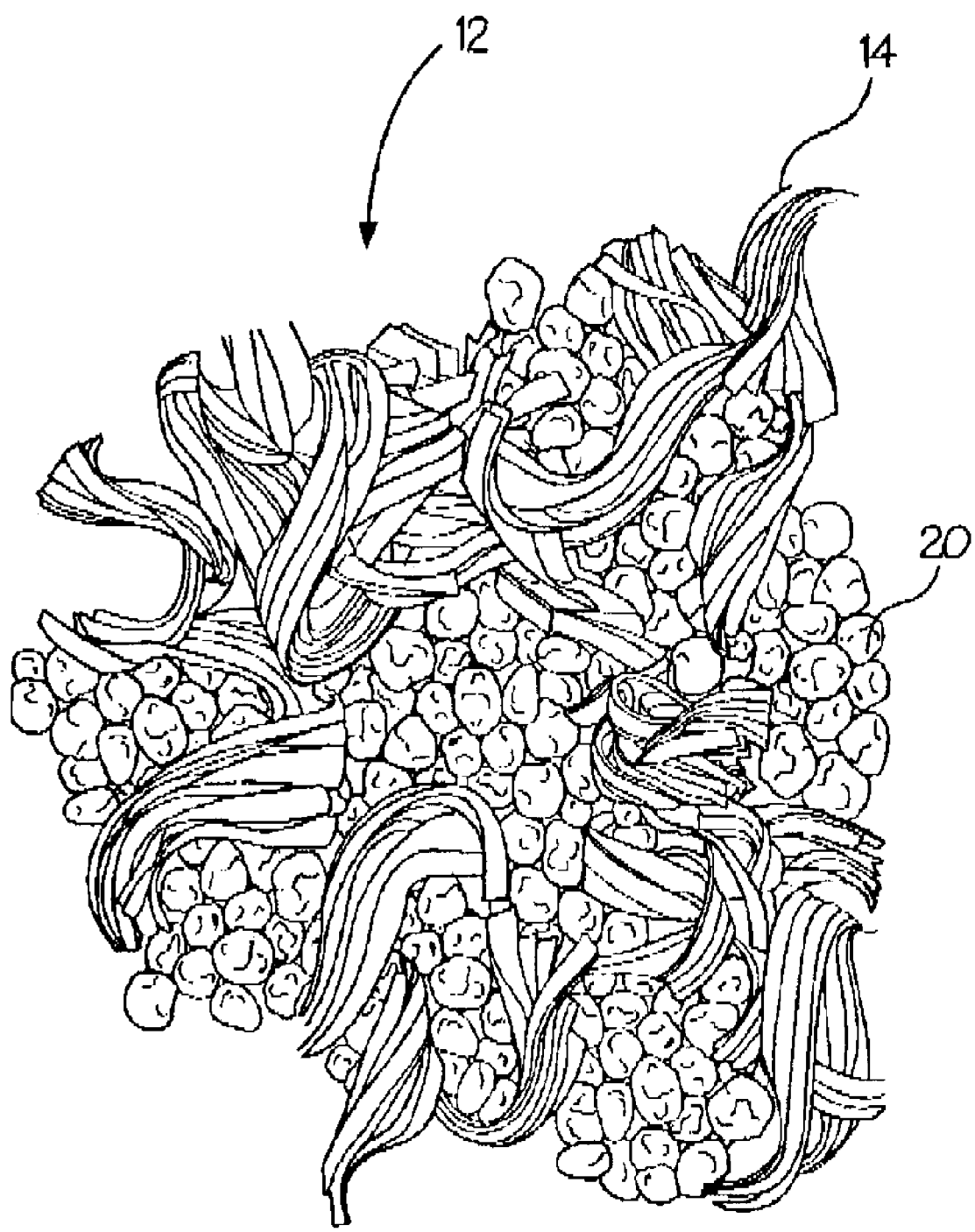
FIG. 5 is a sectional top view showing the filler disposed among tufts.

The particles arranged and structured as shown in FIGS. 2 and 5 also allow even drainage. Because there are no minute particles in the filler to fill the openings between particles, the particles or granules also resist erosion.

The granules are coated with a sealer and are either of natural color or of a desired color.

The arrangement shown in FIGS. 2 and 5 is equally representative of natural turf areas in which case tufts 14 would comprise natural blades of grass extending from ground surface 16. Filler 18 is distributed as earlier described in either natural color form or colored form.

The filler of the instant invention is formed of silica sand ($SiO_2$) occurs naturally in layers or shelves. It must be crushed into particle or granular form for use as the filler of the instant invention. Normally crushed silica sand granules form in a generally round configuration with few if any sharp edges.

Because particle or granule size is critical to the invention, the crushed particles must be sifted through a screening process. It has been found that granules of a size range of between 12 and 40 mesh are most suitable for use as a filler with the above-described surfaces. Further, the filler should be within five mesh sizes in any one application.

Figure 4:
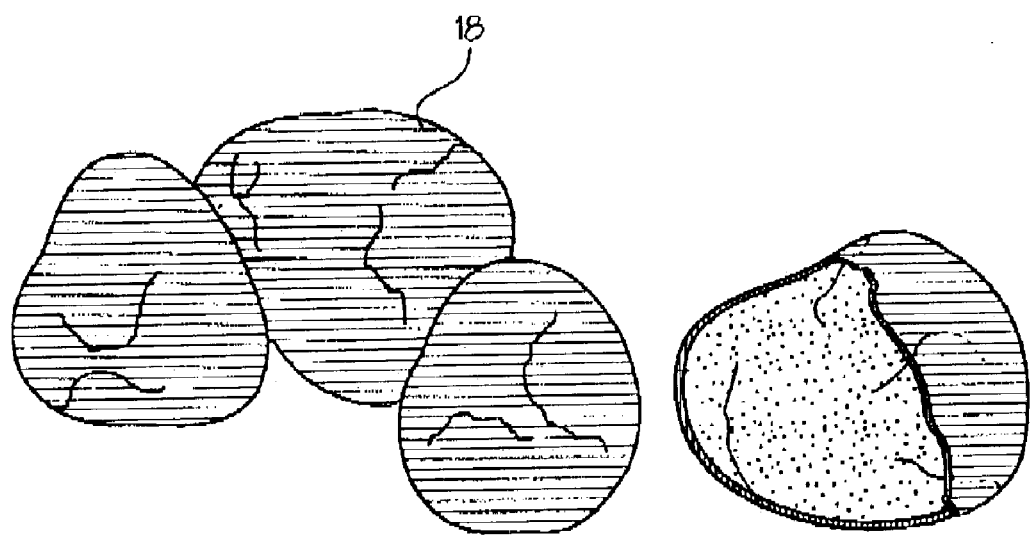
FIG. 4 is an exploded section view of coated silica sand granules.

Granules of silica sand are somewhat porous. In order to eliminate this feature and also to provide the granules with an outer surface which is both water proof and very slick it is desirable that the granules be coated with an acrylic polymer based waterproofing sealer. The coating of choice comprises mineral spirits, xylene, ethylbenzene and acrylic polymer. The acrylic polymer based sealer is clear and therefore, the granules may still have their natural appearance after coating. FIG. 4 shows a cutaway of a coated granule of silica sand. The coating further acts to remove rough edges which may occur over the surface of the particles.

It has also been found that it may be desirable to color the silica sand for a desired aesthetic effect. The colorant of choice is natural pigment in order to ensure that the filler not be a health hazard. Desired colorants for coloring the silica sand is iron oxide ($FeO_2$) for black and chrome (III) oxide ($Cr_2O_3$) for green. Other natural colorants and blends thereof are available should other colors be desired. It has been found, however, that black is the color which most enhances artificial turf or natural turf.

In order to prepare the pigment for application with the silica sand the sealant, is first mixed with the clear acrylic based sealant. The desired ratio for obtaining a mid-range hue is one part colorant to two parts sealer. This ratio may be adjusted to include more or less colorant in order to obtain the desired color depth.

The colorant and the sealer must be thoroughly mixed and applied immediately as the colorant is not soluble and will separate. The aggregate and colored sealer must be thoroughly mixed in order to ensure complete coverage of the aggregate. It is suggested that a cement mixer be used because its aggressive tumbling action prevents clustering of the coated granules. It is preferred that the duration of the mixing or tumbling action is about five minutes. The ratio of sealant/colorant to aggregate is one gallon per ton. Again, more or less sealer/colorant may be used dependent on the desired color and coating desired.

After sealing and coloring the silica sand by blending in the mixer, the granules are discharged onto a drying area. In about five minutes the colored/sealed aggregate is ready for transport to areas of application.

It is noted that the colored/coated silica sand may also be used to decorate cement and masonry structures. Also, they may be used as ground cover. These applications are particularly true of those granules which fall outside the size limits of the turf filler.

What is claimed is:

1. An aggregate turf filler for use with the turf of athletic and landscaped areas, said turf filler aggregate comprising:
    substantially round silica sand particles ($SiO_2$) within a relatively restricted size profile and having an angle of repose of less than 30°; and
    an acrylic polymer based sealer coating and sealing the outer surfaces of said silica sand particles, wherein said coated silica sand particles resist mounding, repel water, resist compacting, present no damaging sharp edges when incorporated with said turf, and are environmentally safe.

2. The turf filler of claim 1 wherein said silica sand particles are sized to be within no more than five mesh sizes.

3. The turf filler of claim 1 wherein said acrylic polymer coating includes natural color pigment of a selected color.

4. The turf filler claim 1 wherein the particles are sized to be between 12 and 40 mesh.

5. A method of producing an environmentally safe aggregate filler for use with athletic fields and landscaped areas comprising:
    selecting silica sand particles that are substantially round and within a relatively restricted size profile and having an angle of repose of less than 30°;
    mixing an acrylic polymer based sealer, a natural colorant, and said silica sand particles to coat said particles with the acrylic polymer based sealant and the natural colorant; and
    drying said coated silica sand particles, thereby to form said environmentally safe aggregate turf filler.

6. The method of claim 5 wherein the particles are sized to be between 12 and 40 mesh.

7. A method of producing an environmentally safe aggregate filler for use with athletic fields and landscaped areas comprising:
    selecting silica sand particles that are substantially round and within a relatively restricted size profile and having an angle of repose of less than 30° ;
    mixing an acrylic polymer based sealer with said silica sand particles to coat said particles with the acrylic polymer based sealant; and
    drying said silica sand particles, thereby to form said environmentally safe aggregate filler.

8. An aggregate turf filler made from the following method:
    selecting silica sand particles ($SiO_2$) that are rounded so as to present no sharp edges, the silica sand particles also being of a restricted size profile;
    coating the silica sand particles with an acrylic polymer based sealer; and
    drying the coated silica sand particles, whereby the coated and dried silica sand particles are able to repel water, and the rounded and restricted size profile of the silica sand particles resists mounding and resists compacting when said silica particles are used with the turf of an artificial turf.

9. The aggregate turf filler of claim 8 wherein the coated and dried silica sand particles have an angle of repose of less than 30°.

10. The aggregate turf filler of claim 8 wherein the silica sand particles are sized within about five mesh sizes.

11. The aggregate turf filler of claim 8 wherein the particles have a size range of 12-40 mesh.

12. The aggregate turf filler of claim 8, further comprising:
combining a colorant with the acrylic polymer based sealer, so that the coated and dried silica sand particles have a colored appearance.

13. A method of forming an artificial turf comprising:
placing an aggregate infill material onto a backing, the backing having pile fibers secured thereto and extending upwardly above the infill material;
the aggregate infill material consisting essentially of rounded silicon dioxide particles coated with an acrylic polymer sealer, being of restricted size profile, and having an angle of repose of less than about 30°; and
wherein the coated silicon dioxide particles resist mounding, repel water, resist compacting, present no damaging sharp edges to the pile fibers, and are environmentally safe.

14. The method of claim 13 wherein the particles of the aggregate infill materials are sized to be between 12 and 40 mesh.

15. The method of claim 13 wherein the coated and sealed silicon dioxide particles are colored.

16. An artificial turf for an athletic or landscaped areas, comprising: a backing having pile fibers extending upwardly therefrom; and a filler of aggregate granules evenly spread on the backing, the filler consisting essentially of substantially round silicon sand particles ($SiO_2$) of a restricted size profile that are coated and sealed with a coating so as to be non-porous and to repel water, wherein the coated and sealed silica sand particles resist mounding, resist compacting, and present no damaging sharp edges when incorporated with the turf, the coated and sealed particles having an angle of repose of less than about 30°, wherein the pile fibers extend substantially above the infill material, and wherein the coating comprises an acrylic polymer sealer.

17. An artificial turf comprising:
a backing having pile fibers secured thereto and extending upwardly therefrom;
an infill material residing on the backing, the infill consisting essentially of substantially round silica sand particles ($SiO_2$) within a relatively restricted size profile, with an acrylic polymer based sealer coating and sealing the outer surfaces of the silica sand particles, wherein the silica sand particles resist mounding, repel water, resist compacting, and present no damaging sharp edges to the pile fibers, wherein the pile fibers extend substantially above the infill material.

18. The artificial turf of claim 17 wherein the acrylic polymer coating includes a color pigment of a selected color.

* * * * *